(12) United States Patent
Lee et al.

(10) Patent No.: US 7,690,820 B2
(45) Date of Patent: Apr. 6, 2010

(54) OPTICAL SHEET AND DISPLAY DEVICE INCLUDING THE SAME

(75) Inventors: Kyung Joon Lee, Seoul (KR); Seung Man Chio, Bucheon-si (KR); Jee Hyun Yang, Seoul (KR); Jin Hyuk Kwon, Daegu (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 113 days.

(21) Appl. No.: 12/003,646

(22) Filed: Dec. 28, 2007

(65) Prior Publication Data

US 2008/0192484 A1 Aug. 14, 2008

(30) Foreign Application Priority Data

Dec. 28, 2006 (KR) .................. 10-2006-0136649

(51) Int. Cl.
*F21V 5/00* (2006.01)
*F21V 7/04* (2006.01)
*G02B 6/32* (2006.01)
*G02B 6/10* (2006.01)

(52) U.S. Cl. .................. 362/327; 362/619; 385/33; 385/146

(58) Field of Classification Search .................. 362/327, 362/330, 331, 335, 616, 617, 619, 625, 628
See application file for complete search history.

(56) References Cited

U.S. PATENT DOCUMENTS 7,400,805 B2 * 7/2008 Abu-Ageel .................. 385/120

* cited by examiner

*Primary Examiner*—John A Ward
(74) *Attorney, Agent, or Firm*—Lee & Morse, P.C.

(57) ABSTRACT

An optical sheet includes a substrate having rear and front surfaces, a micro-lens-array on the front surface of the substrate, the micro-lens-array including a plurality of micro-lenses, a plurality of protrusions spaced apart from each other on the rear surface of the substrate, and an intercepting reflector layer on the protrusions.

21 Claims, 16 Drawing Sheets

T=60 μm

T=90 μm

T=120 μm

T=150 μm

T = 180 μm

Size of Intercepting = 0 μm
Reflector Layer

Size of Intercepting=20 μm
Reflector Layer

Size of Intercepting=40 μm
Reflector Layer

Size of Intercepting=60 μm
Reflector Layer

Size of Intercepting=80 μm
Reflector Layer

OPTICAL SHEET AND DISPLAY DEVICE INCLUDING THE SAME

BACKGROUND OF THE INVENTION

1. Field of the Invention

Embodiments of the present invention relate to an optical sheet. In particular, embodiments of the present invention relate to an optical sheet of a display device.

2. Description of the Related Art

A display device, e.g., a liquid crystal display (LCD), may include a light source, e.g., a plurality of lamps, and at least one optical sheet to collect light emitted from the light source and to direct the collected light in a predetermined direction. The optical sheet may be, e.g., a prism sheet or a micro-lens sheet.

However, the conventional prism sheet may not properly emit light collected from the light source, thereby diffusing light and deteriorating optical efficiency of the display device. Further, the conventional prism sheet may reduce vertical viewing angles of the display device. The conventional micro-lens sheet may transmit light incident thereon at larger emission angles than the corresponding incident angles. When an emission angle is larger than a corresponding incident angle, brightness of light may be deteriorated and overall optical efficiency of the display device may be reduced.

SUMMARY OF THE INVENTION

Embodiments of the present invention are therefore directed to an optical sheet and a display device including the same, which substantially overcome one or more of the disadvantages of the related art.

It is therefore a feature of an embodiment of the present invention to provide an optical sheet with a structure imparting improved brightness to light transmitted therethrough.

It is another feature of an embodiment of the present invention to provide a display device with an optical sheet having a structure imparting improved brightness to light transmitted therethrough.

At least one of the above and other features and advantages of the present invention may be realized by providing an optical sheet, including a substrate having rear and front surfaces, a micro-lens-array on the front surface of the substrate, the micro-lens-array including a plurality of micro-lenses, a plurality of protrusions spaced apart from each other on the rear surface of the substrate, and an intercepting reflector layer on the protrusions.

The protrusions may correspond to edges of respective micro-lenses. The protrusions may include openings therebetween, the openings corresponding to centers of respective micro-lenses. A height of the protrusions may be about 10 μm to about 50 μm, e.g., a height above about 50 μm may decrease efficiency of the intercepting reflector layer. The protrusions may have a rectangular or a trapezoidal vertical cross section. The protrusions may have a trapezoidal vertical cross section, and a width of the trapezoidal cross section may increase as a distance from the substrate increases. The intercepting reflector layer may define a plurality of openings, the openings having rectangular patterns, stripe patterns, or hexagonal patterns. The intercepting reflector layer may define openings having rectangular or hexagonal patterns, the intercepting reflector layer surrounding respective micro-lenses. The intercepting reflector layer may define openings having stripe patterns, the stripe patterns extending along rows or columns of respective micro-lenses.

The intercepting reflector layer may be on rear surfaces of the protrusions. The intercepting reflector layer and the protrusions may have a substantially same shape in plan view. The intercepting reflector layer may include a light reflective material. The light reflective material may include a titanium oxide. A rate of the intercepting reflector layer may be about 15% to about 40%. A thickness of the substrate may be larger than a front focal length of the micro-lenses and smaller than a sum of two front focal lengths of the micro-lenses. A thickness of the substrate may be smaller than a front focal length of the micro-lenses. The micro-lenses may be circular or elliptical. The micro-lenses may be arranged in a matrix structure or in an alternating-lines structure. The micro-lenses may have a radius of curvature of about 50 μm to about 200 μm.

At least one of the above and other features and advantages of the present invention may be realized by providing a liquid crystal display, including a light source, and at least one optical sheet, the optical sheet having a substrate having rear and front surfaces, a micro-lens-array on the front surface of the substrate, the micro-lens-array including a plurality of micro-lenses, a plurality of protrusions spaced apart from each other on the rear surface of the substrate, and an intercepting reflector layer on the protrusions.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
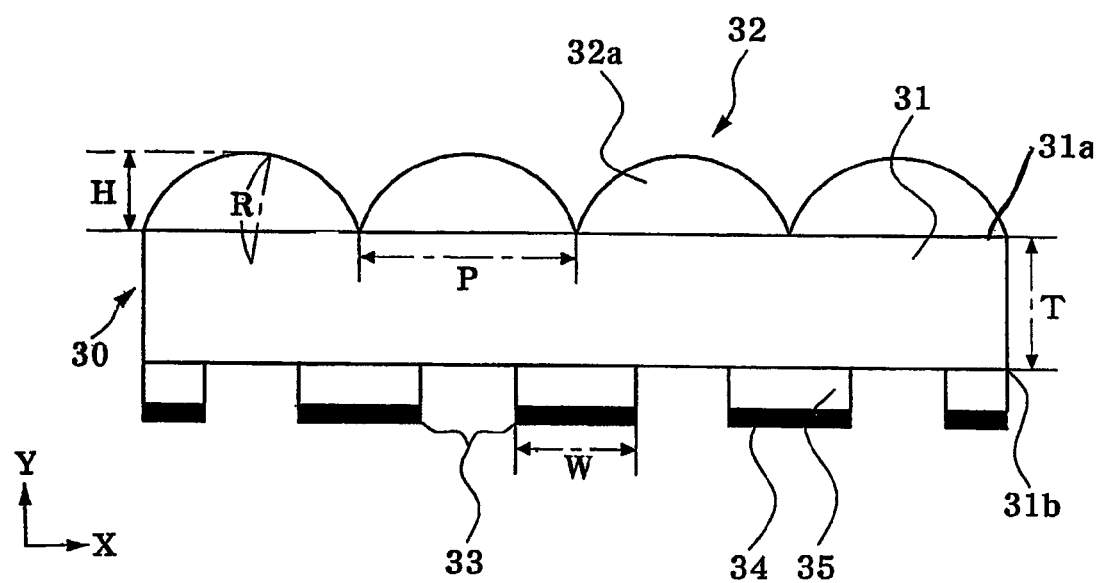
FIG. 1 illustrates a cross-sectional view of an optical sheet according to an embodiment of the present invention.

Korean Patent Application No. 10-2006-0136649, filed on Dec. 28, 2006, in the Korean Intellectual Property Office, and entitled: "Optical Sheet for Back Light Unit," is incorporated by reference herein in its entirety.

Embodiments of the present invention will now be described more fully hereinafter with reference to the accompanying drawings, in which exemplary embodiments of the invention are illustrated. Aspects of the invention may, however, be embodied in different forms and should not be construed as limited to the embodiments set forth herein. Rather, these embodiments are provided so that this disclosure will be thorough and complete, and will fully convey the scope of the invention to those skilled in the art In the figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

An exemplary embodiment of an optical sheet corroding to the present invention will be described in more detail below with respect to FIG. 1. Referring to FIG. 1, an optical sheet 30 may include a flat-plate-shaped substrate 31 having rear and front surfaces 31b and 31a, respectively, opposite each other, a micro-lens-array 32 on the front surface 31a of the substrate 31, a plurality of protrusions 35 spaced apart from each other on the rear surface 31b of the substrate 31, and an intercepting reflector layer 34 on the protrusion 35.

The substrate 31 may be any suitable substrate, and may have a predetermined thickness T. Adjusting the thickness T of the substrate 31 to a predetermined value, e.g., a value lower than a front focal length of the micro-lens-array 32 or a value between a front focal length and a double front focal length of the micro-lens-array 32, may minimize diffusion of light passing through the micro-lens-array 32, as will be discussed in more detail below with reference to FIG. 5.

Figure 6A:
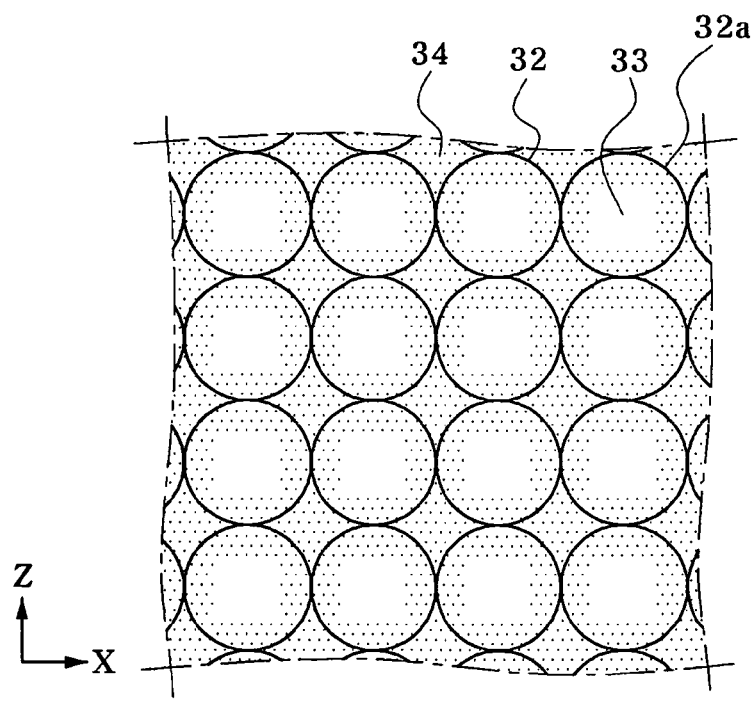
FIGS. 6A-6C illustrate plan views of different intercepting reflector layer structures in an optical sheet according to embodiments of the present invention.
Figure 6B:
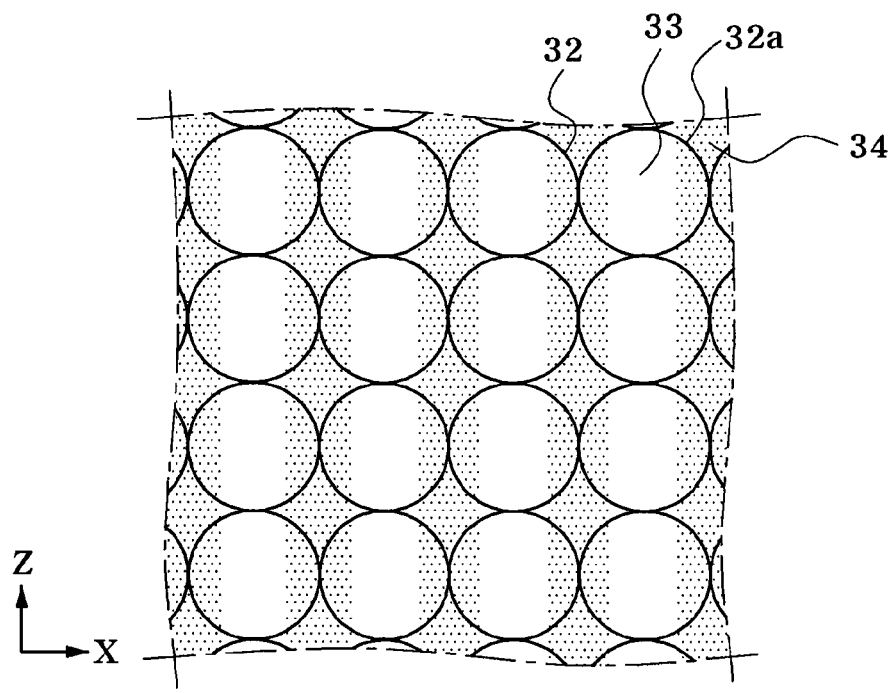
Figure 6C:
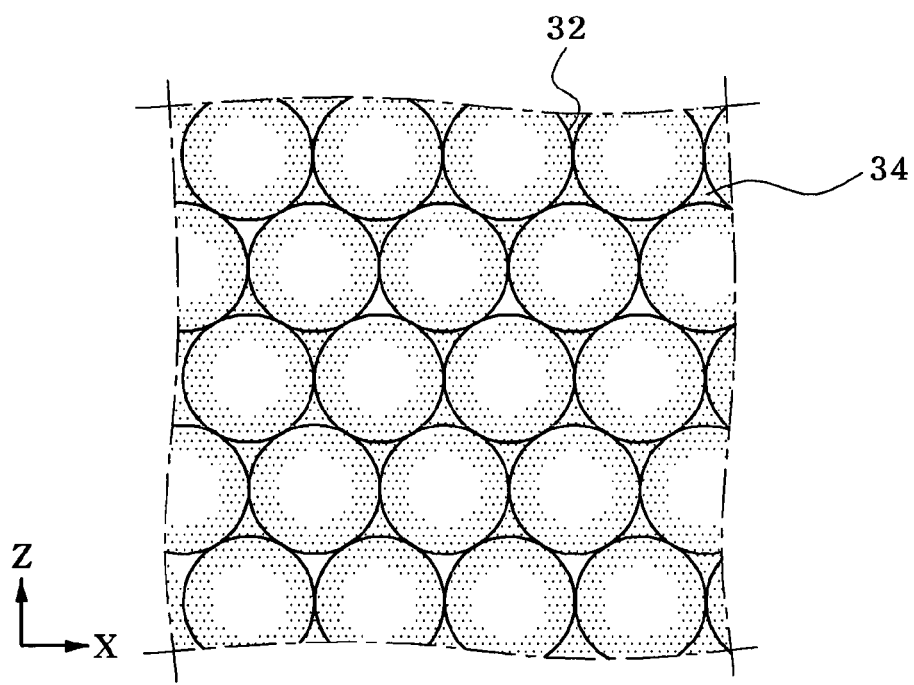

The micro-lens-array 32 of the optical sheet 30 may include a plurality of micro-lenses 32a. The micro-lenses 32a may have a predetermined radius R, e.g., about 50 μm to about 200 μm. The micro-lenses 32a may have a predetermined height H, i.e., a distance as measured in an upward direction from the front surface of the substrate 31 along the y-axis, so the micro-lenses 32a may have a predetermined HR ratio, i.e., a ratio between the height and radius (H/R). The micro-lenses 32a may have a pitch P, i.e., a distance along the x-axis between a first edge of one micro-lens 32a to a first edge of an adjacent micro-lens 32a, as illustrated in FIG. 1. The micro-lenses 32a may or may not be spaced apart from each other, and may be arranged on the front surface of the substrate 31 in any suitable structure. The micro-lenses 32a may be arranged to have X-Y two dimensional regularity, one dimensional regularity, or a random arrangement as long as a Moire pattern is not formed. For example, as illustrated in FIGS. 6A-6B, the micro-lenses 32a may be arranged in a matrix structure, i.e., a plurality of intersecting rows and columns of micro-lenses 21a forming a grid. In another example, as illustrated in FIG. 6C, the micro-lenses 32a may be arranged in an alternating-lines structure, i.e., a line of micro-lenses 32a may be offset with respect to lines parallel and directly adjacent thereto. The micro-lenses 32a may be circular or elliptical, and may be positioned so curvatures thereof may face away from the substrate 31.

As illustrated in FIG. 1, the plurality of protrusions 35 of the optical sheet 30 may be formed on the rear surface 31b of the substrate 31, and may extend away in a downward direction from the substrate 31 along the y-axis. The vertical cross section of the protrusions 35, i.e., a cross section along the y-axis, will be discussed in more detail below with reference to FIGS. 8A-8C. As further illustrated in FIG. 1, the protrusions 35 may be spaced apart from each other to have openings 33 therebetween, so light may be transmitted through the openings 33 and the substrate 31 toward the micro-lens-array 32. The protrusions 35 and openings 33 may be arranged so the protrusions 35 may correspond to edges of respective micro-lenses 32a, and the openings 33 may correspond to centers of respective micro-lenses 32a. It is noted that when a protrusion 35 or an opening 33 "corresponds to" a respective portion of a micro-lens 32a, the respective portion of the micro-lens 32a may be positioned above the protrusions 35 or the opening 33 to at least partially overlap therewith.

The intercepting reflector layer 34 of the optical sheet 30 may be formed on rear surfaces, i.e., surfaces facing away from the micro-lenses 32a, of the protrusions 35, so the protrusions 35 may be between the intercepting reflector layer 34 and the substrate 31. For example, the intercepting reflector layer 34 may be coated on rear surfaces of the protrusions 35, so the intercepting reflector layer 34 may have a substantially same planar cross-section, i.e., a cross-section along the xz-plane, as the rear surfaces of the protrusions 35. In other words, the intercepting reflector layer 34 may be applied to the rear surfaces of the protrusions 35 without overlapping with the openings 33 between the protrusions 35, so the openings 33 may be between portions of the intercepting reflector layers 34. Preventing overlap between the openings 33 and intercepting reflector layer 34 along the y-axis may facilitate transmission of light emitted from a light source through the openings 33. Planar cross sections of the intercepting reflector layer 34 will be discussed in more detail below with reference to FIGS. 6A-6C.

The intercepting reflector layer 34 may be formed of at least one light reflective material e.g., titanium oxide ($TiO_2$), and may intercept and reflect light emitted from the light source at large angles, i.e., angles determined with respect to a normal to the light source, as will be discussed in more detail below with reference to FIG. 5. A width of the intercepting reflector layer 34 may be adjusted with respect to a width of the openings 33 to facilitate control of the angular range of light incident on the micro-lenses 32a of the micro-lens-array 32. For example, an increase of the width W of the intercepting reflector layer 34 may reduce the width of the openings 33. Further, a decrease of the width of the openings 33 may increase a probability that only light emitted from a closely positioned light source to the optical axis of the micro-lens-array 32 may pass through the openings 33. That is, increasing the width W of the intercepting reflector layer 34 may facilitate transmittance of substantially only light emitted from the closely positioned light source through the openings 33, thereby substantially minimizing light emission at large emission angles. Minimized emission of light at large emission angles may substantially concentrate light in a predetermined direction, thereby improving light collection efficiency of the optical sheet 30. It is noted that "emission angles" and "incident angles" hereinafter refer to angles formed with respect to an optical axis of a lens. A "width" hereinafter may refer to a distance along the x-axis, i.e., as illustrated in FIG. 1, and may indicate a width of a single opening or a single portion of the intercepting reflector layer 34, as further illustrated in FIG. 1.

The optical sheet 30 formed according to embodiments of the present invention may be advantageous in providing a substantially reduced amount of light emitted at large emission angles, thereby reducing optical loss. The width W of the intercepting reflector layer 34, the height of the protrusion 35, and the thickness T of the substrate 31 may be adjusted to provide a proper emission angle of light in order to increase brightness.

Figure 2:
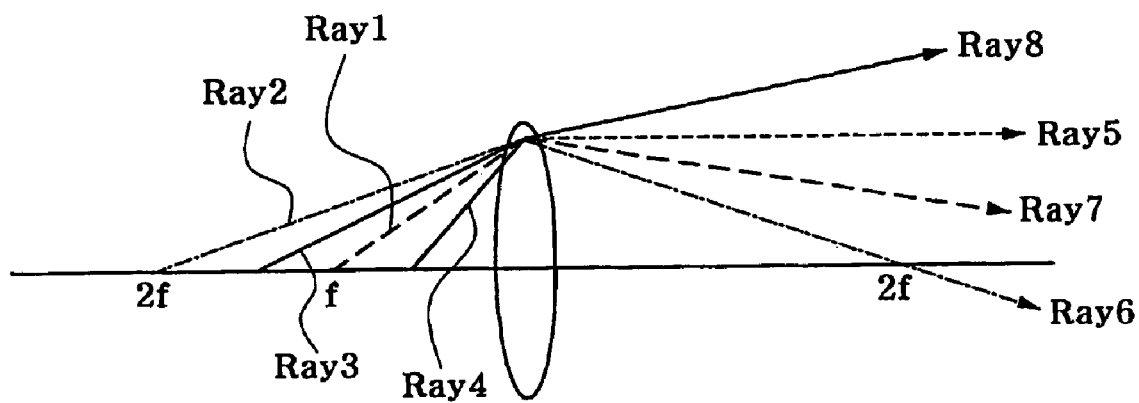
FIG. 2 illustrates a conceptual diagram of light concentration through a lens.

Adjustment of the emission angle of light emitted from the micro-lens-array 32 will be described with respect to FIGS. 2-5. As illustrated in FIG. 2, light emitted from a point positioned between a front focal length f of an optical lens and a double front focal length 2f, i.e., two front focal lengths f, of the optical lens, or between the front focal length f and the lens, may have an emission angle smaller than its corresponding incident angle. More specifically, as illustrated in FIG. 2, light emitted from the front focal point f toward the lens, i.e., Ray 1, may be transmitted through the lens and emitted in parallel to a horizontal optical axis of the lens, i.e., Ray 5. Light emitted from the double front focal point 2f toward the lens, i.e., Ray 2, may be transmitted through the lens and emitted at a substantially same angle as the incident angle, i.e., Ray 6 may be emitted from the lens to intersect the horizontal optical axis of the lens at a distance 2f from the lens. Therefore, light emitted from any point positioned between the front focal length f and double front focal length 2f of the lens, e.g., Ray 3, may have a smaller emission angle, e.g., Ray 7, than its corresponding incident angle. Similarly, light emitted from a point positioned closer to the lens than the front focal length f, e.g., Ray 4, may have a smaller emission angle, e.g., Ray 8, than its corresponding incident angle. Light emitted from a lens at smaller emission angles than their corresponding incident angles may be concentrated in a predetermined direction, thereby increasing brightness.

Figure 3:
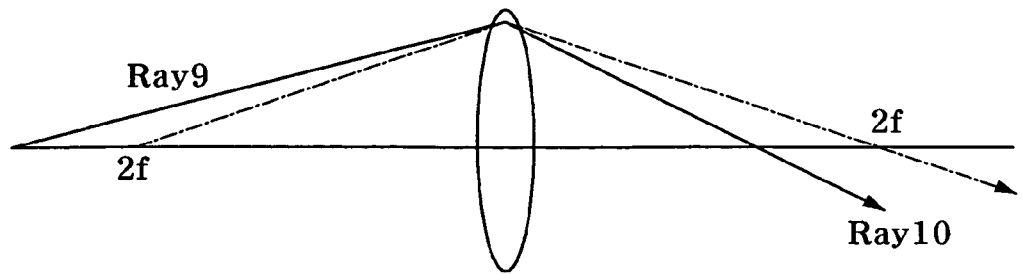
FIG. 3 illustrates a conceptual diagram of light diffusion through a lens.

On the other hand, as illustrated in FIG. 3, light emitted from a point positioned further from the lens than the double front focal length 2f, e.g., Ray 9, may have a larger emission angle, e.g., Ray 10, than its corresponding incident angle. A larger emission angle than its corresponding incident angle may trigger light diffusion, thereby minimizing overall light brightness.

Figure 4:
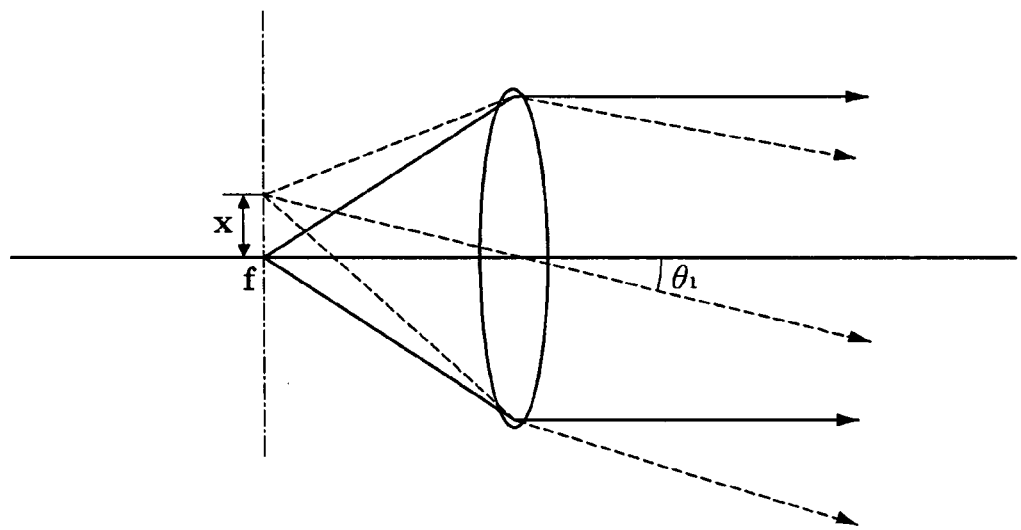
FIG. 4 illustrates a detailed conceptual diagram of light concentration through a lens.

Accordingly, the optical sheet 30 may be configured such that a light source may be positioned between the double front focal length 2f and the front focal length f of the micro-lens-array 32, or closer to the micro-lens-array 32 than the front focal f length thereof, in order to facilitate light concentration. Further, the intercepting reflector layer 34 may increase interception of light emitted at large angles from the light source, i.e., angles determined with respect to a normal to the light source, and may direct the intercepted light toward the micro-lens-array 32 in order to improve optical efficiency and brightness. When a light source is spaced apart from the front focal length f of the lens, e.g., micro-lens-array 32, by a predetermined distance x, rays of light may be emitted from the lens at an angle θ1 with respect to the horizontal optical axis of the lens, as illustrated in FIG. 4. The front focal length f may be related to the distance x and the emission angle θ1 according to Equation 1 below.

$$\theta_1 = \tan^{-1}\left(\frac{x}{f}\right) \quad \text{Equation 1}$$

Figure 5:
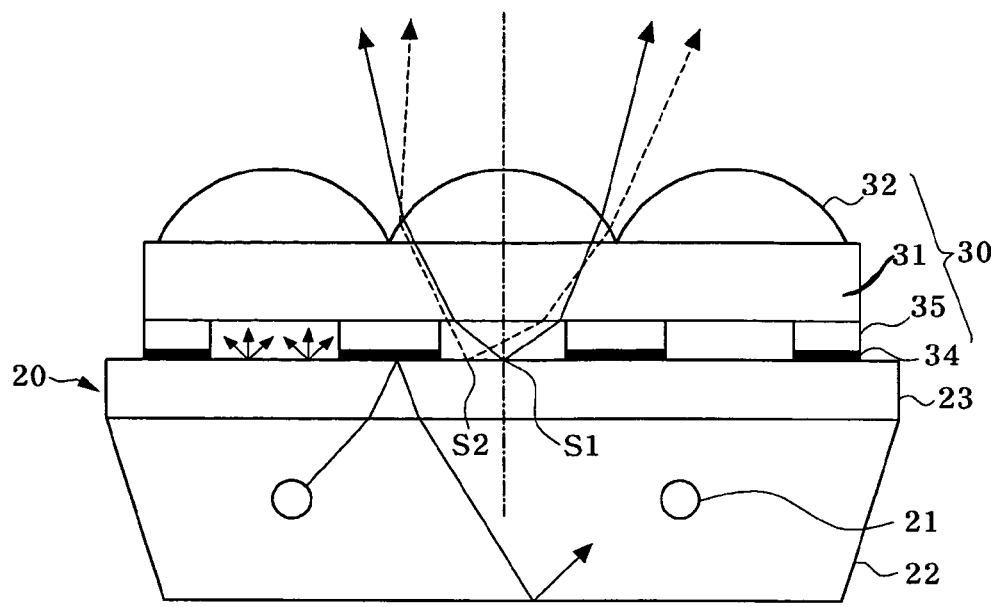
FIG. 5 illustrates a cross-sectional view of light concentration through openings of an optical sheet according to an embodiment of the present invention.

For example, as illustrated in FIG. 5, a light source, i.e., lamps 21, may be surrounded by a reflector sheet 22, so a diffuser sheet 23 positioned on the reflector sheet 22 may face the lamps 21. The diffuser sheet 23 may be, e.g., a Lambertian type diffuser sheet, and may function as a surface light source to diffuse and spread light emitted from the lamps 21 uniformly in all directions. Accordingly, any point on the diffuser sheet 23 may be an equivalent of a light source transmitting light.

The optical sheet 30 may be positioned on the diffuser sheet 23, so the protrusions 35 may face the diffuser sheet 23. Accordingly, light emitted from the diffuser sheet 23 toward the optical sheet 30 may be incident on the substrate 31 of the optical sheet 30, i.e., through the openings 33, and may be transmitted through the substrate 31 and through the micro-lens-array 32 in a predetermined direction. As such, the thickness T of the substrate 31 may be adjusted to be smaller than the front focal length f of the micro-lens-array 32 in order to facilitate concentration of light emitted from the diffuser sheet 23.

For example, as further illustrated in FIG. 5, a point light source S1 positioned on an optical axis at the front focal length of a micro-lens 32a may emit light incident on the micro-lens 32a, so the light is transmitted through the micro-lens 32a and emitted therefrom in parallel to the optical axis. In another example, a point light source S2 spaced apart from the optical axis, as illustrated in FIG. 5, may emit light incident on the micro-lens 32a, so the light is transmitted through the micro-lens 32a and emitted therefrom at a predetermined angle θ1 with respect to the optical axis as determined according to Equation 1 above.

The intercepting reflector layer 34 of the optical sheet 30 may reflect away light emitted from a light source positioned at a relatively long distance from the optical axis. For example, light emitted from the lamps 21 toward the optical sheet 30 may be intercepted by the intercepting reflector layer 34, and may be reflected away from the optical sheet 30. The light reflected away by the intercepting reflector layer 34 may be incident on the reflector sheet 22, and may be reflected by the reflector sheet 22 toward the diffuser sheet 23 to be transmitted toward the optical sheet 30. Use of the intercepting reflector layer 34 may be advantageous in minimizing emission of light at large emission angles by reflecting away light emitted from distant light sources. If light from distant sources is not reflected away by the intercepting reflector layer 34, the light may pass directly through the micro-lens-array 32 to be emitted at large emission angles, thereby diffusing light and reducing brightness.

The intercepting reflector layer 34 may have any suitable structure defining a plurality of closed-shaped openings, e.g., circles, squares, hexagons, and so forth, or open-shaped openings, e.g., stripes, for directing light. For example, as illustrated in FIG. 6A, the intercepting reflector layer 34 may have a grid structure on micro-lenses 32a arranged in a matrix pattern with a check pattern of the openings 33. The intercepting reflector layer 34 may be coated on and overlap with the protrusions 35, and may be positioned to correspond to boundaries of respective micro-lenses 32a. In other words, the intercepting reflector layer 34 may include a plurality of intersecting vertical and horizontal portions, so each vertical and/or horizontal portion may correspond to and overlap with a respective boundary between two adjacent lines of micro-lenses 32a. When the intercepting reflector layer 34 has a grid structure, square and/or rectangular frames may surround the micro lenses 32a, so the openings 33 may be square. Such a structure may provide an opening 33 to each micro-lens 32a, and may provide an effective interception of light emitted at large angles, i.e., as determined with respect to a normal to the light source.

In another example, as illustrated in FIG. 6B, the intercepting reflector layer 34 may have a stripe-pattern structure, i.e., a plurality of longitudinal portions in a single direction, on micro-lenses 32a arranged in a matrix pattern. In other words, the longitudinal portions, i.e., stripes, of the intercepting reflector layer 34 may be, e.g., vertical and/or horizontal, thereby corresponding to and overlapping with a respective boundary between two adjacent lines of micro-lenses 32a of the micro-lens-array 32. Despite exhibiting a reduced efficiency, as compared to the structure illustrated in FIG. 6A, the structure illustrated in FIG. 6B may facilitate a manufacturing process of the optical sheet 30. In other words, since the protrusions 35 may be formed in a stripe-pattern, i.e., the protrusions 35 and intercepting reflector layer 34 may have a substantially similar planar cross section, along a single direction, manufacturing steps and time may be reduced.

In yet another example, as illustrated in FIG. 6C, the intercepting reflector layer 34 may have a structure including hexagonal openings corresponding to micro-lenses 32a arranged in an alternating-lines structure. In other words, the intercepting reflector layer 34 may define a plurality of hexagonal openings corresponding to the openings 33, such that the plurality of hexagonal openings may correspond to the micro lenses 32a. This configuration may provide a higher efficiency to intercept light emitted at large angles, i.e., angles determined with respect to a normal to the light source, as compared to the structure illustrated in FIG. 6A.

Figure 7:
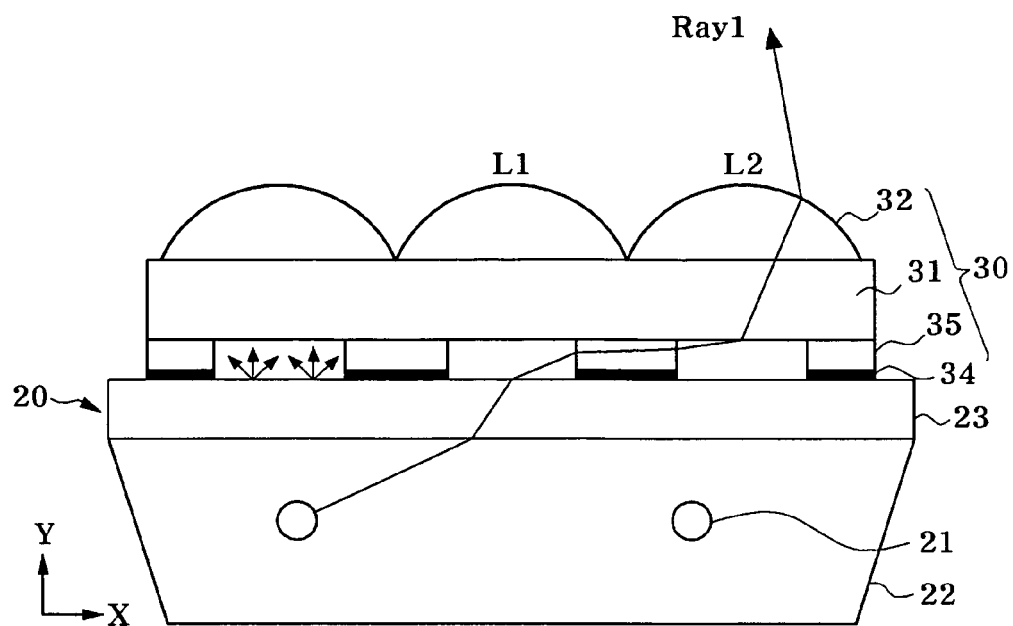
FIG. 7 illustrates a cross-sectional view of light collection through a protrusion according to an embodiment of the present invention.

As illustrated in FIG. 7, light incident on side surfaces of the protrusions 35 at a predetermined angle may be refracted within the protrusions 35, so light may be adjusted to be incident on a predetermined portion of the micro-lens-array 32. For example, light incident on a side surface of a protrusion 35, as illustrated in FIG. 7, may be refracted multiple times to be incident on a right portion of the lens L2 and to be emitted at a substantially small emission angle, i.e., Ray 1. Accordingly, adjusting the height of the protrusions 35 and the width of the openings 33 may control the light through the openings 33 and/or side surfaces of the protrusions 35, thereby limiting light incident on the micro-lenses 32a of the micro-lens-array 32 and facilitating control of a viewing angle. For example, a height of the protrusions may be about 10 μm to about 50 μm. Some of the light passing through the lens L2 may be refracted to be reflected by the reflector sheet 22. The protrusions 35 may be formed of a substantially same material as the substrate 31. For example, the protrusions 35 may be formed of a material having a refractive index above about 1.4, e.g., polycarbonate, polystyrene, polymethyl methacrylate (PMMA), polyethylene terephthalate (PET), and so forth.

Figure 8A:
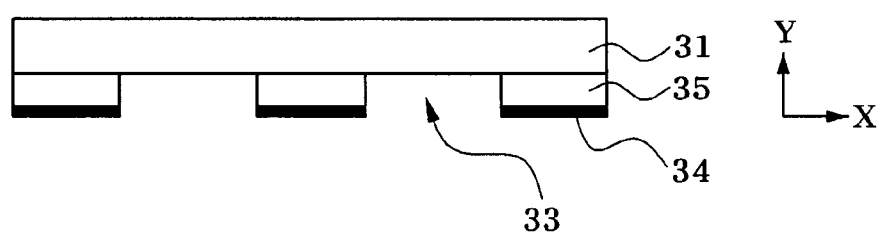
FIGS. 8A-8C illustrate cross-sectional views of different protrusion structures in an optical sheet according to embodiments of the present invention.
Figure 8B:
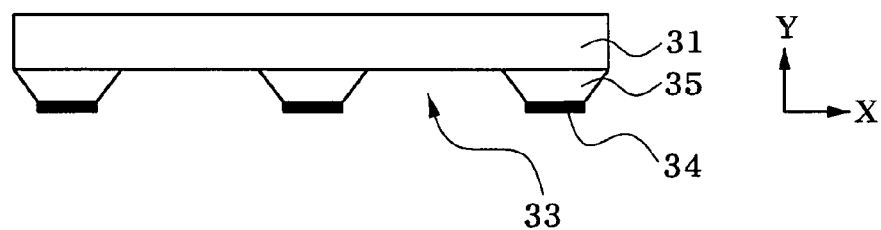
Figure 8C:
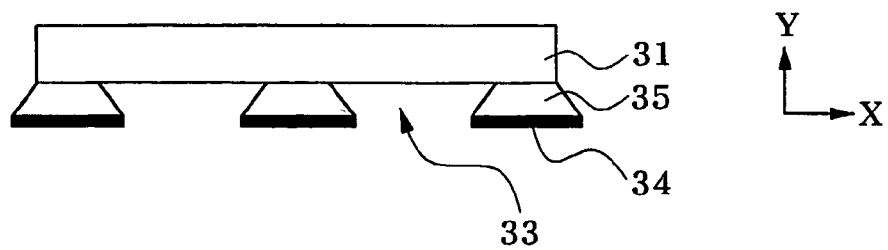

The protrusions 35 may have any suitable vertical cross section. For example, as illustrated in FIG. 8A, side surfaces of the protrusions 35 may protrude vertically away from the substrates 31 to form rectangular cross-section. In another example, as illustrated in FIGS. 8B-8C, the protrusions 35 may have trapezoidal cross-sections. That is, as illustrated in FIG. 8B, the protrusions may have an inverted trapezoidal cross section, i.e., a width of the protrusions 35 along the x-axis may decrease as a distance along the y-axis from the substrate 31 increases. Similarly, the protrusions 35 may have upright trapezoidal cross sections, as illustrated in FIG. 8C, so a width of the protrusions 35 may increase as a distance from the substrate 31 increases. When the protrusions 35 have an upright trapezoidal cross section, as illustrated in FIG. 8C, an amount of light incident on side surfaces of the protrusions 35 may be reduced, thereby reducing an amount of light reflected back toward the reflector sheet 22.

Figure 9:
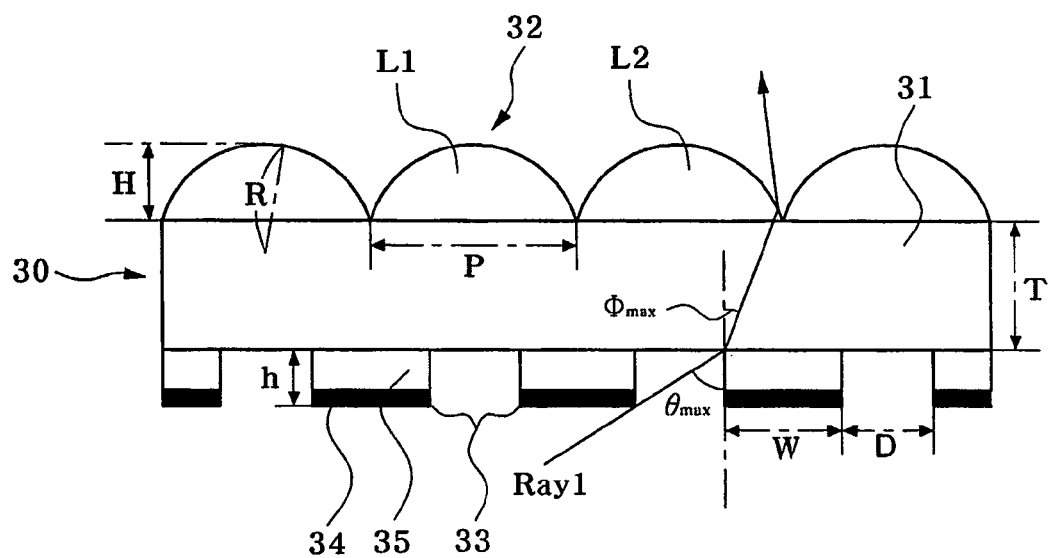
FIG. 9 illustrates a cross-sectional diagram of transmittance of light with a maximum incident angle through an optical sheet according to an embodiment of the present invention.
Figure 10A:
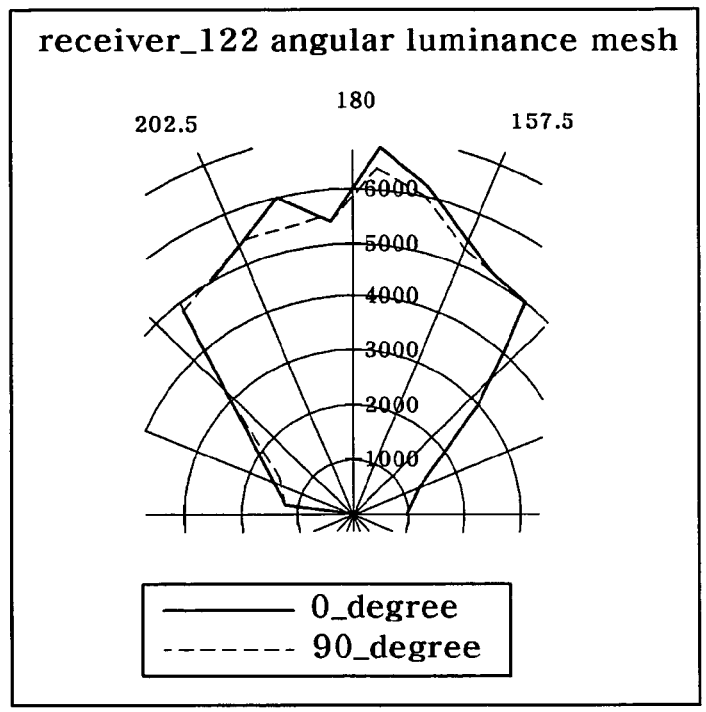
FIGS. 10A-10E illustrate graphs of optical characteristics of optical sheets according to Examples 1-5, respectively.
Figure 10B:
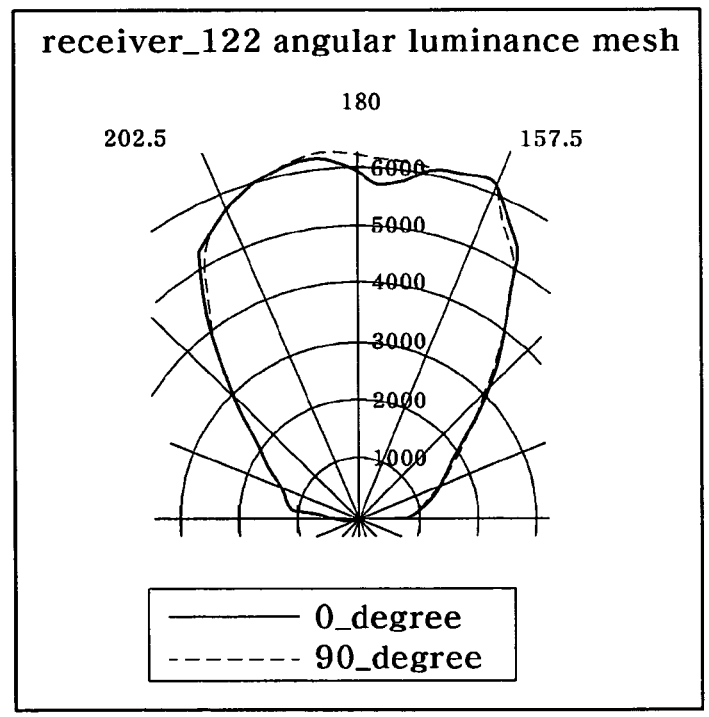
Figure 10C:
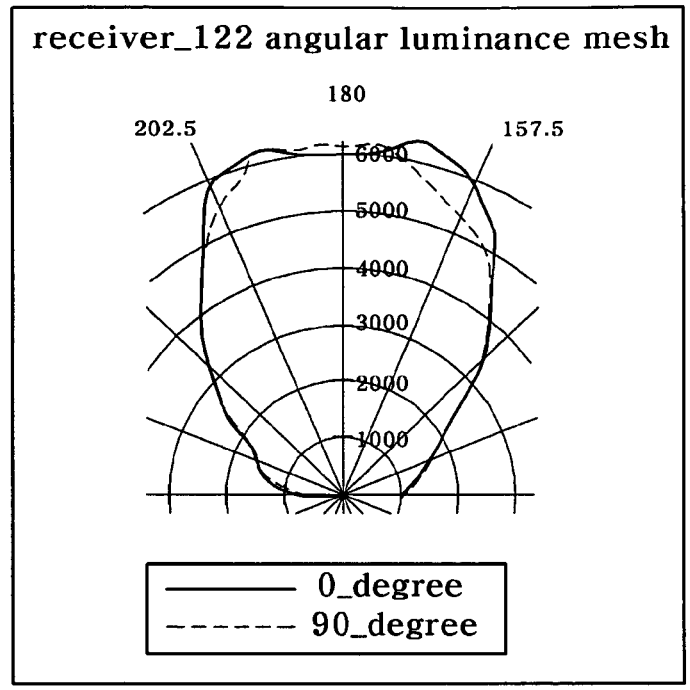
Figure 10D:
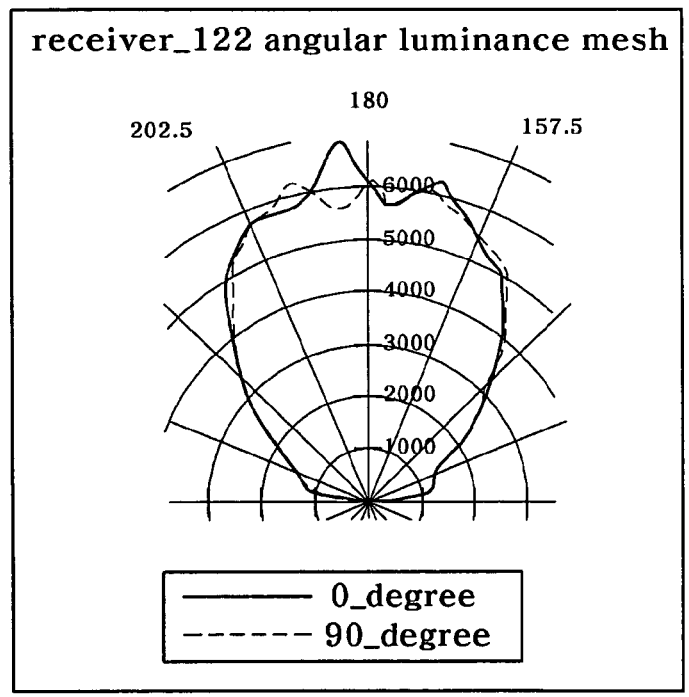
Figure 10E:
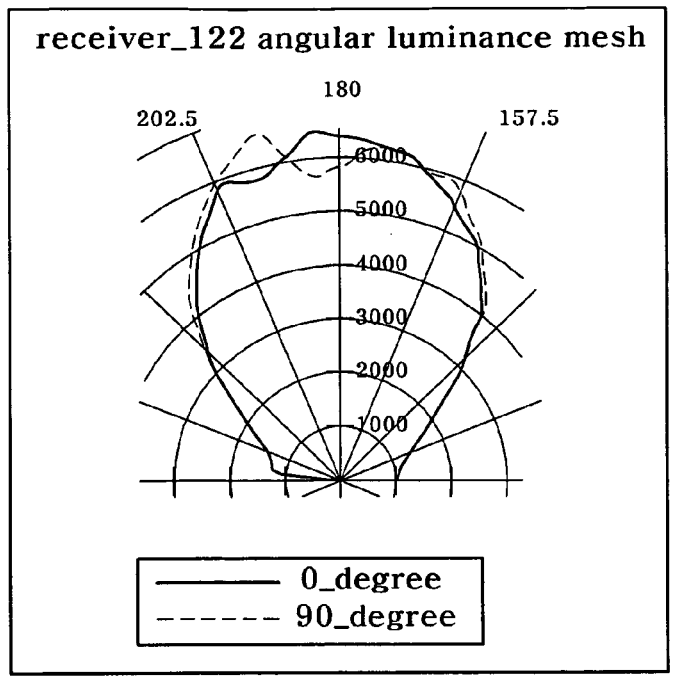
Figure 11A:
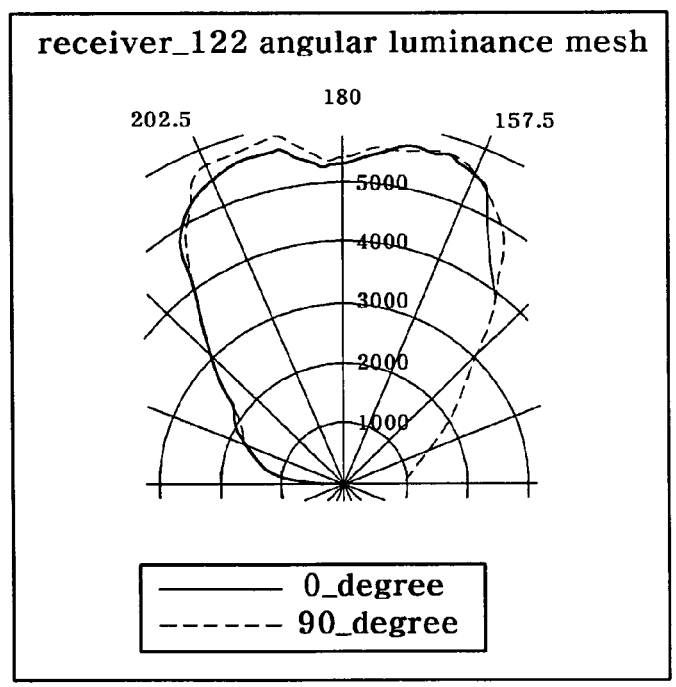
FIGS. 11A-11E illustrate graphs of optical characteristics of optical sheets according to Examples 6-10, respectively.
Figure 11B:
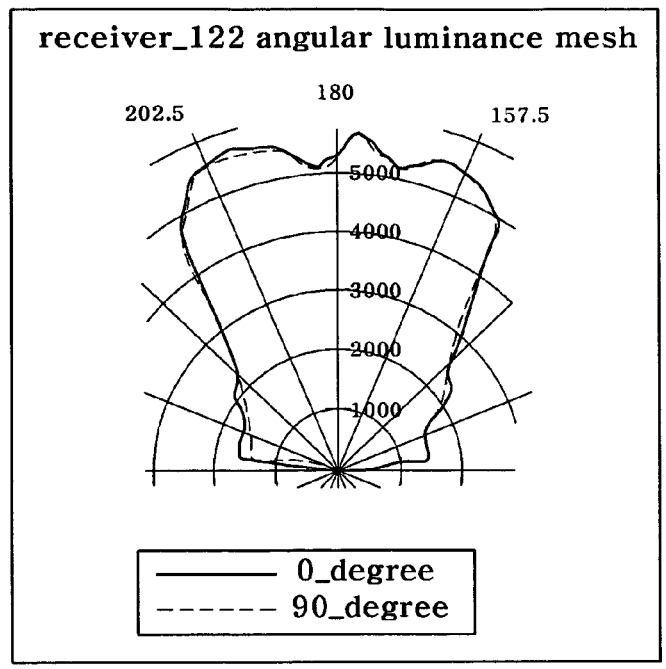
Figure 11C:
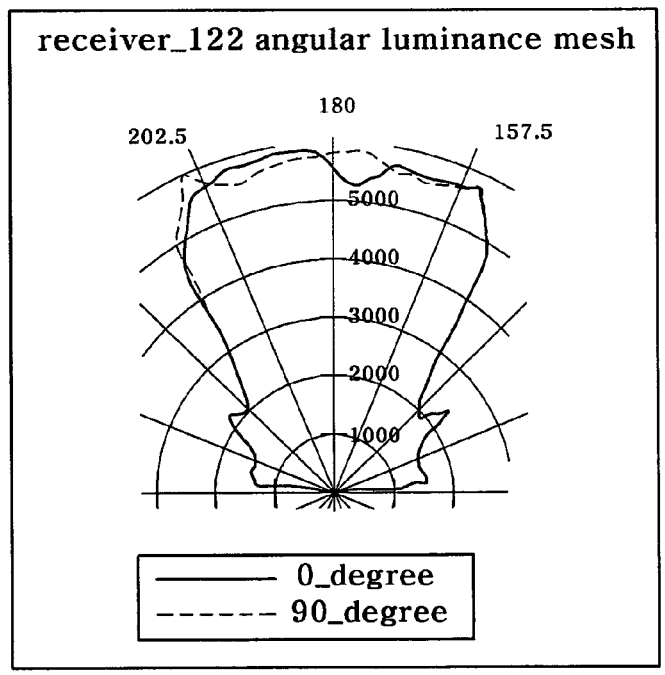
Figure 11D:
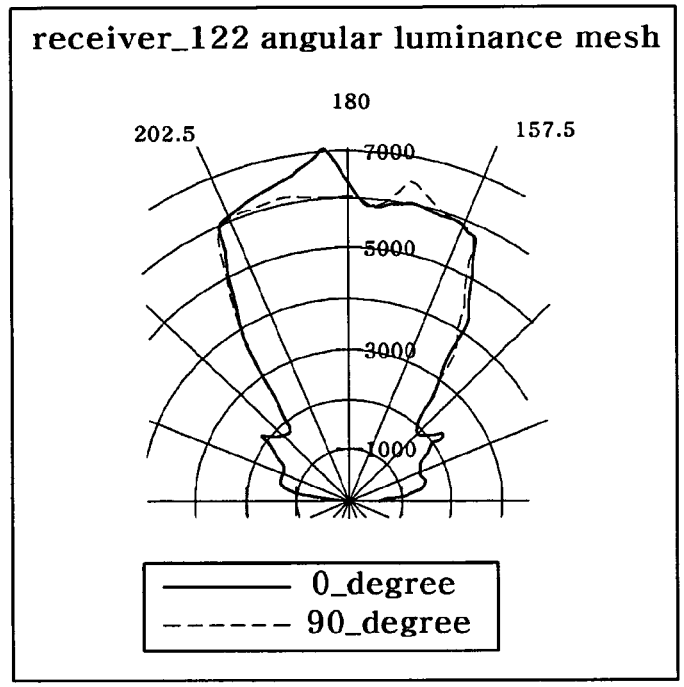
Figure 11E:
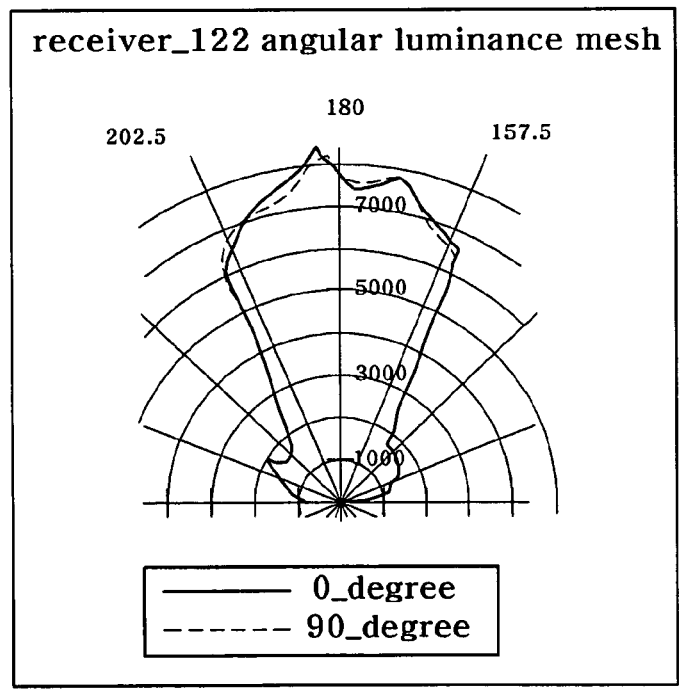

As illustrated in FIG. 9, the thickness T of the substrate 31 of the optical sheet 30 may be adjusted with respect to the width W of the intercepting reflector layer 34 and the radius of curvature R of the micro-lenses 32a in order to control an emission angle of light from the micro-lens-array 32. That is, as illustrated in FIG. 9, in order to adjust light transmitted through the openings 33 to be incident on a right portion of the lens L2, i.e., Ray 1, the width W of the intercepting reflector layer 34, the thickness T of the substrate 31 of the optical sheet 30, and the radius of curvature R of the micro-lenses 32a may satisfy the relationship of Equations 2-3, where $\Phi_{max}$ is a maximum incident angle on the micro-lens-array 32.

$$\frac{W}{2} \geq T\tan\Phi_{max} \quad \text{Equation 2}$$

$$\frac{W}{2} + T\tan\Phi_{max} \geq R \quad \text{Equation 3}$$

In view of Equations 2-3, the width W of the intercepting reflector layer 34 may be as small as possible. Solving Equation 2-3 may provide a thickness $T_1$ and a width $W_1$, i.e., Equations 4-5 below, in terms of radius R and maximum incident angle $\Phi_{max}$.

$$T_1 = \frac{R}{2\tan\Phi_{max}} \quad \text{Equation 4}$$

$$W_1 = 2T_1\tan\Phi_{max} = R \quad \text{Equation 5}$$

The maximum incident angle may be calculated according to Snell's Law, i.e., Equation 6, where n is a refractive index of air having a value of 1, n' is a refractive index of the diffuser sheet 22, $\theta_{max}$ is a maximum incident angle of light in the opening 33, and $\Phi_{max}$ is a refraction angle corresponding to the maximum incident angle $\theta_{max}$, i.e., a maximum incident angle on the micro-lens-array 32.

$$\Phi_{max} = \sin^{-1}\left(\frac{n\sin\theta_{max}}{n'}\right) \quad \text{Equation 6}$$

The possible maximum incident angle $\theta_{max}$ of light in the opening 33 may be limited by a shape of the protrusions 35, i.e., Equation 7, where h is a combined height of a protrusion 35 and the intercepting reflector layer 34 and D is a width of an opening 33.

$$\theta_{max} = \tan^{-1}\left(\frac{h}{D}\right) \quad \text{Equation 7}$$

Figure 15:
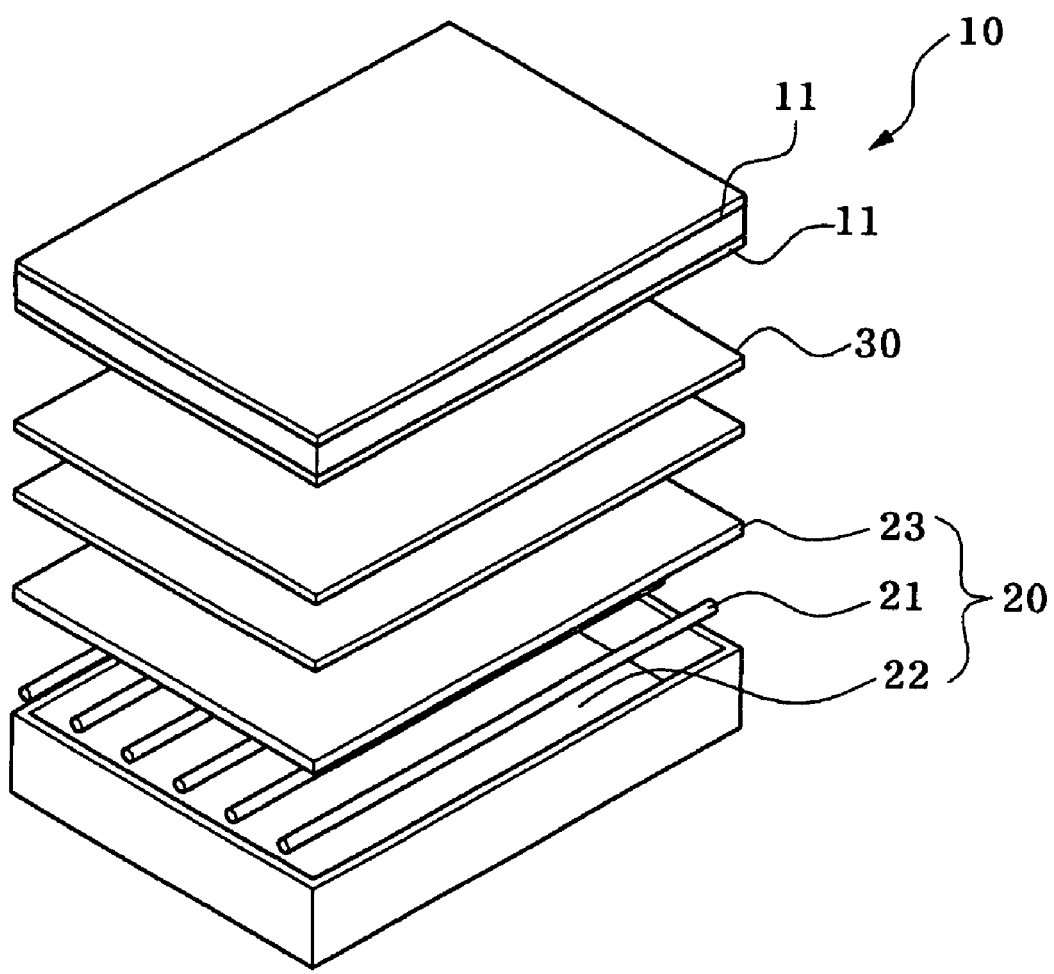
FIG. 15 illustrates an exploded perspective view of a liquid crystal display including an optical sheet according to an embodiment of the present invention.

A liquid crystal display (LCD) according to an embodiment of the present invention may include a back light unit 20 and a liquid crystal panel 10, as illustrated in FIG. 15. The liquid crystal panel may include a plurality of liquid crystal cells arranged in a matrix form, so application of an electric field to the liquid crystal cells may adjust alignment thereof to affect light transmission therethrough. A polarizer 11 may be attached to the liquid crystal panel 10 to polarize light emitted from the back light unit 20.

The back light unit 20 of the LCD, e.g., a direct type or an edge type, may include the lamps 21, the reflector sheet 22, the diffuser sheet 23, and at least one optical sheet 30. For example, as illustrated in FIG. 15, the back light unit 20 may include two optical sheets 30. The back light unit 20 may include more than two optical sheets 30, e.g., three.

EXAMPLES

Examples 1-5

Optical sheets were formed according to embodiments of the present invention. The optical sheets were formed of polycarbonate having a refractive index of 1.59. The optical sheets had micro-lenses with a radius of curvature of 100 μm and HR ratio of 1, openings having width and length of 100 μm and 106 μm, respectively, and protrusion having a height of 30 μm. The front focal length of the micro-lenses 32a in the optical sheet was calculated according to Equation 9 below to be 170 μm, where $r_1$ refers to a radius of curvature of a lens surface closest to the light source and $r_2$ refers to a radius of curvature of a lens surface furthest from the light source.

$$\frac{1}{f} = (n-1)\left(\frac{1}{r_1} - \frac{1}{r_2}\right) \qquad \text{Equation 9}$$

The thickness T of the substrate of each optical sheet was varied between 60 μm and 180 μm, and brightness and viewing angle with respect to each optical sheet was calculated. Calculations were performed via a numerical analysis.

The brightness was calculated by setting a total luminous flux emitted from a single cold cathode fluorescence lamp (CCFL) to 100 lumens, and a center brightness value was calculated relative to 100 lumens. The viewing angle was calculated by a half width of brightness. The values for brightness and viewing angle were obtained via simulation software (LightTools, Optical Research Associates (USA)). Results are reported in Table 1 and in FIGS. 10A-10E.

TABLE 1

| | Example 1 | Example 2 | Example 3 | Example 4 | Example 5 |
|---|---|---|---|---|---|
| Thickness T of Substrate (μm) | 60 | 90 | 120 | 150 | 180 |
| Center Brightness (nit) | 6079 | 6136 | 6286 | 6308 | 6302 |
| Viewing Angle (°) | 95 | 89 | 93 | 95 | 86 |

As can be seen from Table 1 and FIGS. 10A-10E, as a thickness of the substrate approached the front focal length of the micro-lens, i.e., 170 μm, the center brightness increased and the viewing angle decreased. This is because when a thickness of the substrate of the optical sheet approached the front focal length of the micro-lens, light emitted from the micro-lenses approached an emission angle of 0°, i.e., substantially parallel.

Examples 6-10

Optical sheets were formed according to embodiments of the present invention. The optical sheets were formed of polycarbonate having a refractive index of 1.59. The optical sheets had micro-lenses with a radius of curvature of 100 μm and HR ratio of 0.8, a substrate having a thickness of 100 μm, and protrusion having a height of 10 μm. The front focal length of the micro-lenses was 170 μm. The width of the intercepting reflector layer of each optical sheet was varied between 0 μm and 80 μm, and brightness and viewing angle with respect to each optical sheet were calculated. Calculations were performed via a numerical analysis. Results are reported in Table 2 and in FIGS. 11A-11E.

TABLE 2

| | Example 6 | Example 7 | Example 8 | Example 9 | Example 10 |
|---|---|---|---|---|---|
| Width of Intercepting Reflector Layer (μm) | 0 | 20 | 40 | 60 | 80 |
| Center Brightness (nit) | 5639 | 5521 | 5817 | 6327 | 7371 |
| Viewing Angle (°) | 96 * 96 | 84 * 84 | 76 * 76 | 70 * 70 | 60 * 60 |

As can be seen in Table 2 above, an increase in width of the intercepting reflector layer increased the center brightness and reduced the viewing angle. This is because increasing a width of the intercepting reflector layer caused the position of the light source to approach the center of the opening, thereby reducing an amount of light emitted at large angles and increasing collection efficiency of light through the micro-lenses. As can be further seen in Table 2, the viewing angle may be adjusted to a desired value by adjusting the width of the intercepting reflector layer.

Examples 11-30

Optical sheets were formed according to embodiments of the present invention. The optical sheets were formed of polycarbonate having a refractive index of 1.59. The optical sheets had a substrate having a thickness of 100 μm, protrusion having a height of 10 μm, and a viewing angle of 80°. The radius of the micro-lenses and width of the intercepting reflector layer of each optical sheet were varied, and brightness and rate of intercepting reflector layer were calculated. The rate of the intercepting reflector layer is defined as a fraction of a size of the intercepting reflector layer relative to the lens, i.e., a ratio between the width of intercepting reflector layer and the lens pitch multiplied by 100. Results are reported in Table 3.

TABLE 3

| | Radius of Curvature of Micro-Lens (R) | HR Ratio | Center Brightness (nit) | Width of Intercepting Reflector Layer (μm) | Lens Pitch (μm) | Rate of Intercepting Reflector Layer (%) |
|---|---|---|---|---|---|---|
| Ex. 11 | 100 μm | 0.6 | 5463 | 37 | 183 | 20.2 |
| Ex. 12 | | 0.7 | 5633 | 34 | 191 | 17.8 |

TABLE 3-continued

| | Radius of Curvature of Micro-Lens (R) | HR Ratio | Center Brightness (nit) | Width of Intercepting Reflector Layer (μm) | Lens Pitch (μm) | Rate of Intercepting Reflector Layer (%) |
|---|---|---|---|---|---|---|
| Ex. 13 | | 0.8 | 5579 | 29 | 196 | 14.8 |
| Ex. 14 | | 0.9 | 5745 | 28 | 199 | 14.1 |
| Ex. 15 | | 1.0 | 5943 | 18 | 200 | 9 |
| Ex. 16 | 130 μm | 0.6 | 6099 | 74 | 238 | 31.1 |
| Ex. 17 | | 0.7 | 6386 | 77 | 248 | 31.0 |
| Ex. 18 | | 0.8 | 6185 | 76 | 255 | 29.8 |
| Ex. 19 | | 0.9 | 5893 | 65 | 259 | 25.1 |
| Ex. 20 | | 1.0 | 5878 | 44 | 260 | 16.9 |
| Ex. 21 | 160 μm | 0.6 | 6482 | 100 | 293 | 34.1 |
| Ex. 22 | | 0.7 | 6264 | 98 | 306 | 32.0 |
| Ex. 23 | | 0.8 | 6276 | 100 | 314 | 31.8 |
| Ex. 24 | | 0.9 | 6263 | 102 | 318 | 32.1 |
| Ex. 25 | | 1.0 | 6358 | 96 | 320 | 30.0 |
| Ex. 26 | 190 μm | 0.6 | 6740 | 136 | 348 | 39.1 |
| Ex. 27 | | 0.7 | 6560 | 127 | 363 | 35.0 |
| Ex. 28 | | 0.8 | 6499 | 130 | 372 | 34.9 |
| Ex. 29 | | 0.9 | 6325 | 125 | 378 | 33.1 |
| Ex. 30 | | 1.0 | 6321 | 122 | 380 | 32.1 |

Examples 31-50

Optical sheets were formed according to embodiments of the present invention. The optical sheets were formed of polycarbonate having a refractive index of 1.59. The optical sheets had a substrate having a thickness of 100 μm, protrusion having a height of 20 μm, and a viewing angle of 80°. The radius of the micro-lenses and width of the intercepting reflector layer of each optical sheet were varied, and brightness and rate of intercepting reflector layer were calculated. Results are reported in Table 4.

TABLE 4

| | Radius of Curvature of Micro-Lens (R) | HR Ratio | Center Brightness (nit) | Width of Intercepting Reflector Layer (μm) | Lens Pitch (μm) | Rate of Intercepting Reflector Layer |
|---|---|---|---|---|---|---|
| Ex. 31 | 100 μm | 0.6 | 5574 | 37 | 183 | 20.2 |
| Ex. 32 | | 0.7 | 5602 | 36 | 191 | 18.8 |
| Ex. 33 | | 0.8 | 5784 | 33 | 196 | 16.8 |
| Ex. 34 | | 0.9 | 5735 | 32 | 199 | 16.1 |
| Ex. 35 | | 1.0 | 5830 | 30 | 200 | 15.0 |
| Ex. 36 | 130 μm | 0.6 | 5792 | 62 | 238 | 26.1 |
| Ex. 37 | | 0.7 | 5874 | 65 | 248 | 26.2 |
| Ex. 38 | | 0.8 | 5853 | 64 | 255 | 25.1 |
| Ex. 39 | | 0.9 | 5787 | 54 | 259 | 20.1 |
| Ex. 40 | | 1.0 | 5673 | 34 | 260 | 13.1 |
| Ex. 41 | 160 μm | 0.6 | 5907 | 85 | 293 | 29.0 |
| Ex. 42 | | 0.7 | 5895 | 83 | 306 | 27.1 |
| Ex. 43 | | 0.8 | 5949 | 85 | 314 | 27.1 |
| Ex. 44 | | 0.9 | 5910 | 86 | 318 | 27.0 |
| Ex. 45 | | 1.0 | 5978 | 83 | 320 | 25.9 |
| Ex. 46 | 190 μm | 0.6 | 6279 | 139 | 348 | 39.9 |
| Ex. 47 | | 0.7 | 6198 | 123 | 363 | 33.9 |
| Ex. 48 | | 0.8 | 6038 | 112 | 372 | 30.1 |
| Ex. 49 | | 0.9 | 5969 | 110 | 378 | 29.1 |
| Ex. 40 | | 1.0 | 6028 | 106 | 380 | 27.9 |

As can be seen in Tables 3-4 above, an increase of radius of curvature of the micro-lenses 32a increased the center brightness. In other words, an increase in radius increased an amount of light incident on portions of lenses corresponding to the openings, thereby reducing light emitted at large angles. Additionally, as seen in Tables 3-4, an increase in radius of curvature of the lenses increased the rate of the intercepting reflector layer, while an increase of the HR ratio for a predetermined radius decreased the rate of the intercepting reflector layer. As further seen in Tables 3-4, a preferred radius range of the lens was about 50 μm to about 200 μm, and a preferred rate of the intercepting reflector layer was between about 15% to about 40% when the viewing angle was 80° and center brightness exhibited a maximum value. A preferred protrusion height was within a range of about 10 μm to about 50 μm.

Figure 12A:
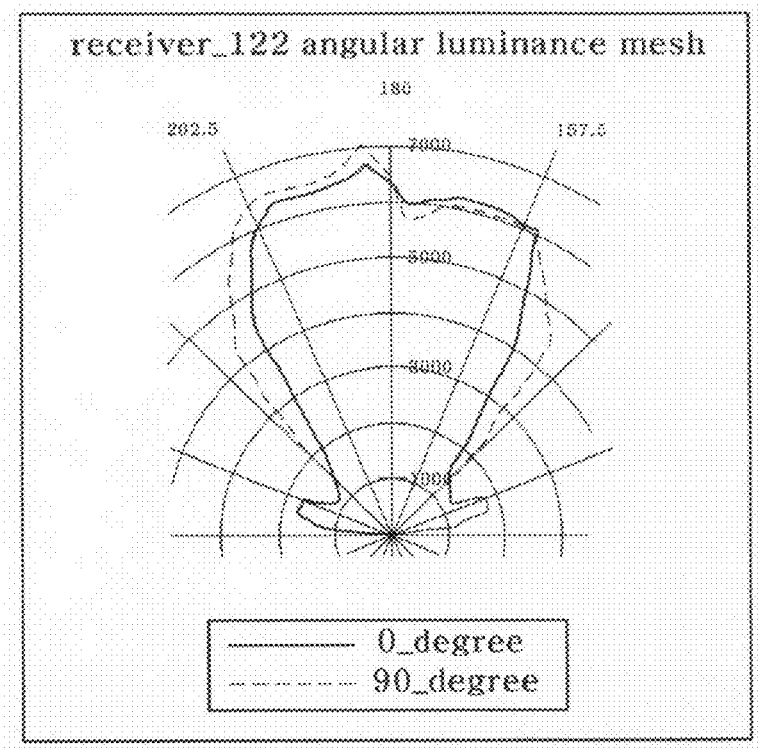
FIGS. 12A-12B illustrate graphs of optical characteristics of optical sheets according to Example 17.
Figure 12B:
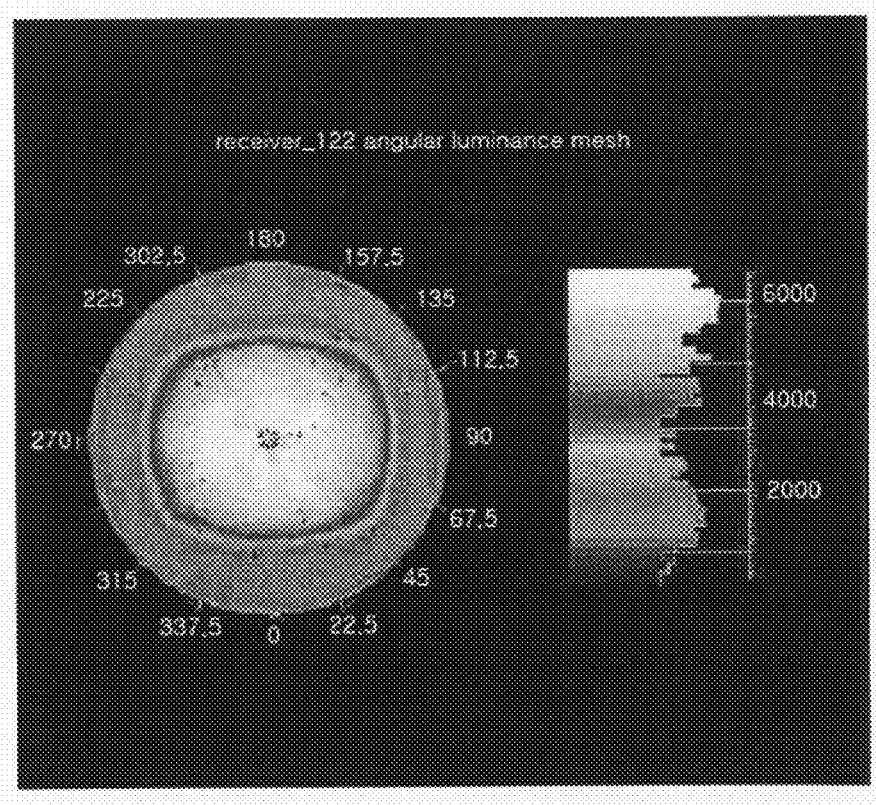

For example, i.e., in Example 17, the openings were formed to have width and length of 149 μm and 194 μm, respectively. Accordingly, a size of the opening corresponded to 60%×78%, respectively, of the lens pitch. As illustrated in FIGS. 12A-12B, the analysis of the optical sheet exhibited substantially no side-lobes, i.e., indicating substantially no small emission angles, and horizontal and the vertical viewing angles were 86° and 72°, respectively. The brightness was 6256 nit.

Figure 13A:
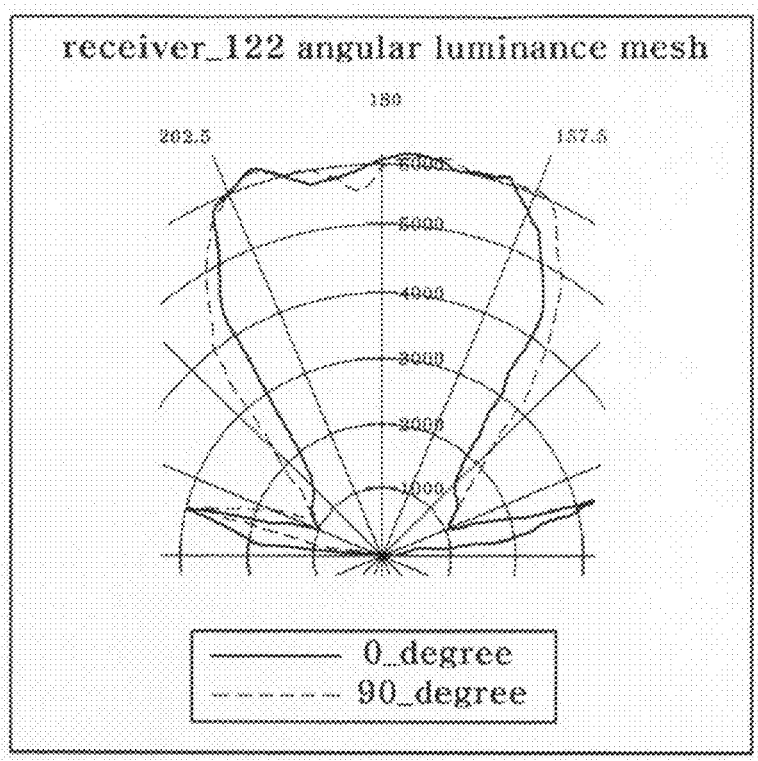
FIGS. 13A-13B illustrate graphs of optical characteristics of optical sheets according to Example 41.
Figure 13B:
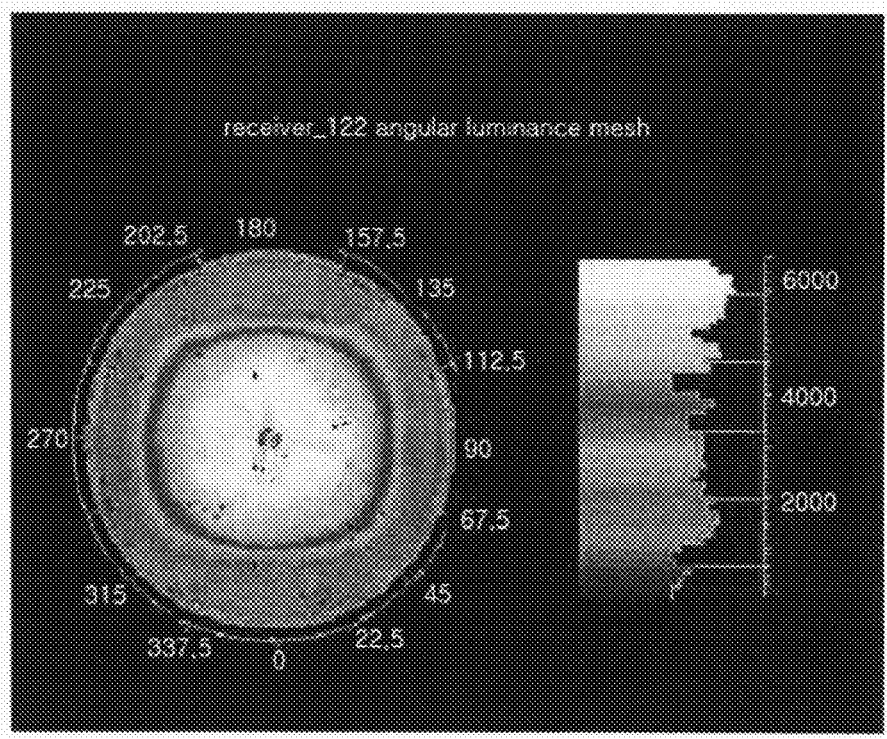

In another example, i.e., in Example 41, the openings were formed to have width and length of 182 μm and 225 μm, respectively. Accordingly, a size of the opening corresponded to 62%×77%, respectively, of the lens pitch. As illustrated in FIGS. 13A-13B, the optical sheet exhibited horizontal and the vertical viewing angles of 86° and 73°, respectively, and a center brightness of 5980 nit.

Comparative Example

Figure 14A:
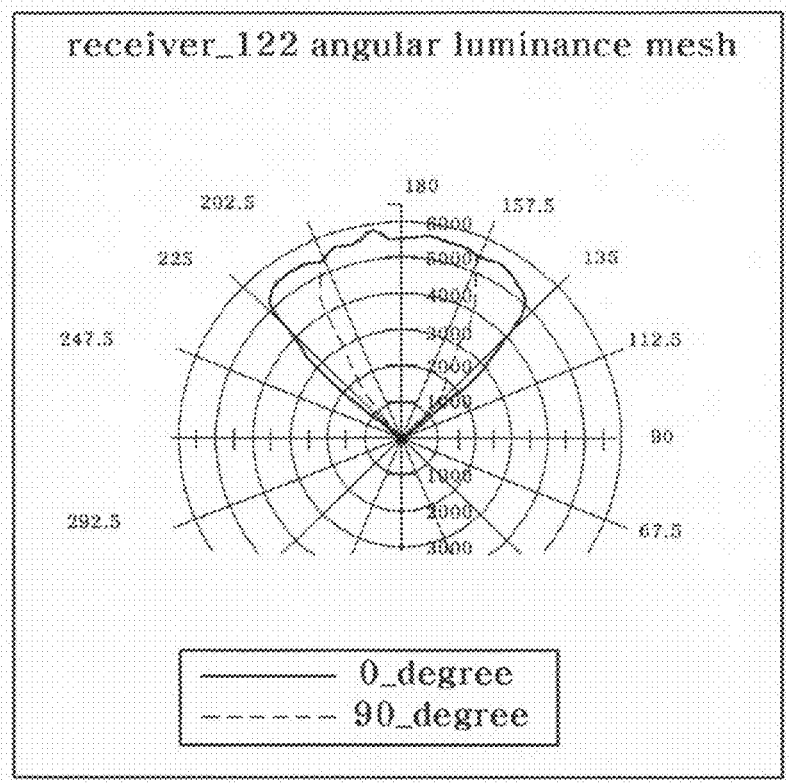
FIG. 14A-14B illustrate graphs of optical characteristics of an optical sheet according to a Comparative Example.
Figure 14B:
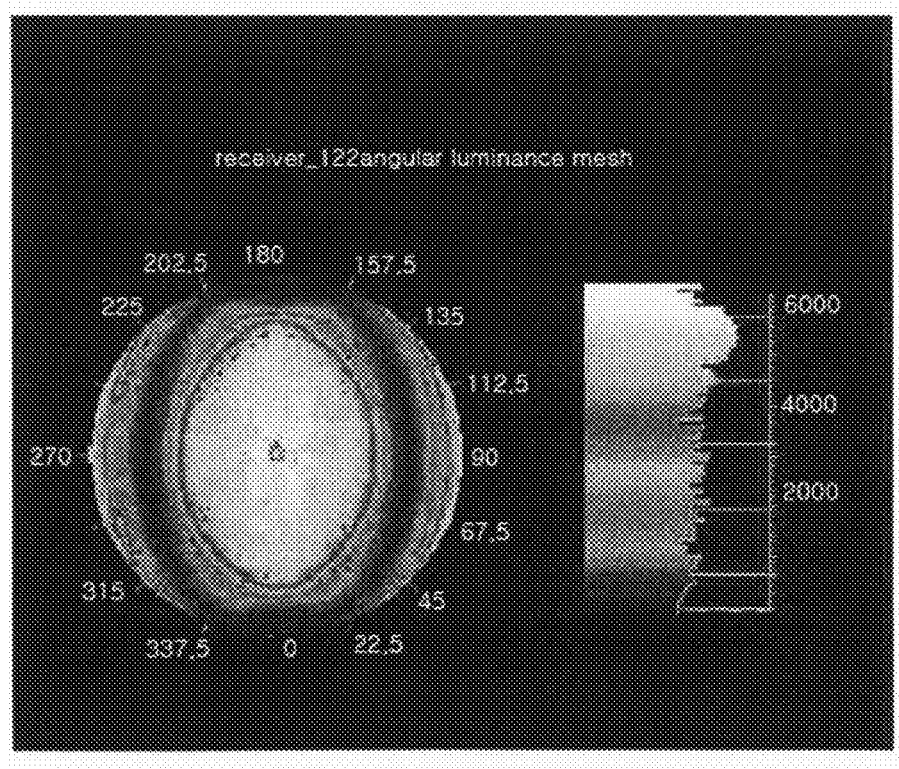

An optical sheet including a plurality of triangular prisms was configured such that the prisms were arranged over a substrate of the optical sheet to have a constant pitch. As illustrated in FIGS. 14A-14B, the optical sheet including the plurality of prisms exhibited vertical and horizontal viewing angles of 66° and 98°, respectively, and center brightness of 5660 nit. Further, the analysis of the optical sheet in the Comparative Example exhibited large side-lobes, indicating light emitted at large emission angles.

The optical sheet formed according to embodiments of the present invention may be advantageous in providing a substantially reduced amount of light emitted at large angles, i.e., as determined with respect to an optical axis of the micro-lenses, thereby reducing optical loss. The height of the protrusion 35, the width of the intercepting reflector layer 34, the thickness of the substrate 31, and radius of the micro-lens of the optical sheet 30 may be adjusted to provide increased brightness.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An optical sheet, comprising:
   a substrate having rear and front surfaces;
   a micro-lens-array on the front surface of the substrate, the micro-lens-array including a plurality of micro-lenses;
   a plurality of protrusions spaced apart from each other on the rear surface of the substrate, the protrusions having front surfaces on the substrate; and
   an intercepting reflector layer on rear surfaces of the protrusions, the rear surfaces of the protrusions being opposite to the front surfaces of the protrusions.

2. The optical sheet as claimed in claim 1, wherein the protrusions overlap edges of respective micro-lenses.

3. The optical sheet as claimed in claim 1, wherein the protrusions include openings therebetween, the openings overlapping centers of respective micro-lenses.

4. The optical sheet as claimed in claim 1, wherein a height of the protrusions is about 10 μm to about 50 μm.

5. The optical sheet as claimed in claim 1, wherein the protrusions have a rectangular or a trapezoidal vertical cross section.

6. The optical sheet as claimed in claim 5, wherein the protrusions have a trapezoidal vertical cross section, and a width of the trapezoidal cross section increases as a distance from the substrate increases.

7. The optical sheet as claimed in claim 1, wherein the intercepting reflector layer defines a plurality of openings, the openings having rectangular patterns, stripe patterns, or hexagonal patterns.

8. The optical sheet as claimed in claim 7, wherein the intercepting reflector layer defines openings having rectangular or hexagonal patterns, the intercepting reflector layer surrounding respective micro-lenses.

9. The optical sheet as claimed in claim 7, wherein the intercepting reflector layer defines openings having stripe patterns, the stripe patterns extending along rows or columns of respective micro-lenses.

10. The optical sheet as claimed in claim 1, wherein the intercepting reflector layer is only on the rear surfaces of the protrusions.

11. The optical sheet as claimed in claim 1, wherein the intercepting reflector layer includes a light reflective material.

12. The optical sheet as claimed in claim 11, wherein the light reflective material includes a titanium oxide.

13. The optical sheet as claimed in claim 1, wherein a rate of the intercepting reflector layer is about 15% to about 40%.

14. The optical sheet as claimed in claim 1, wherein a thickness of the substrate is larger than a front focal length of the micro-lenses and smaller than a sum of two front focal lengths of the micro-lenses.

15. The optical sheet as claimed in claim 1, wherein a thickness of the substrate is smaller than a front focal length of the micro-lenses.

16. The optical sheet as claimed in claim 1, wherein the micro-lenses are circular or elliptical.

17. The optical sheet as claimed in claim 1, wherein the micro-lenses are arranged in a matrix structure or in an alternating-lines structure.

18. The optical sheet as claimed in claim 1, wherein the micro-lenses have a radius of curvature of about 50 μm to about 200 μm.

19. The optical sheet as claimed in claim 10, wherein the protrusions are completely spaced apart from each other.

20. A liquid crystal display, comprising:
a light source; and
at least one optical sheet, the optical sheet including:
a substrate having rear and front surfaces,
a micro-lens-array on the front surface of the substrate, the micro-lens-array including a plurality of micro-lenses,
a plurality of protrusions spaced apart from each other on the rear surface of the substrate, the protrusions having front surfaces on the substrate, and
an intercepting reflector layer on rear surfaces of the protrusions, the rear surfaces of the protrusions being opposite to the front surfaces of the protrusions.

21. The optical sheet as claimed in claim 10, wherein the intercepting reflector layer and the rear surfaces of the protrusions completely overlap each other.

* * * * *